April 11, 1967 L. G. KILMER 3,313,372
GAS TANK HOLDER FOR GAS EXPLODER SEISMIC GENERATORS
Filed June 30, 1964 2 Sheets-Sheet 1
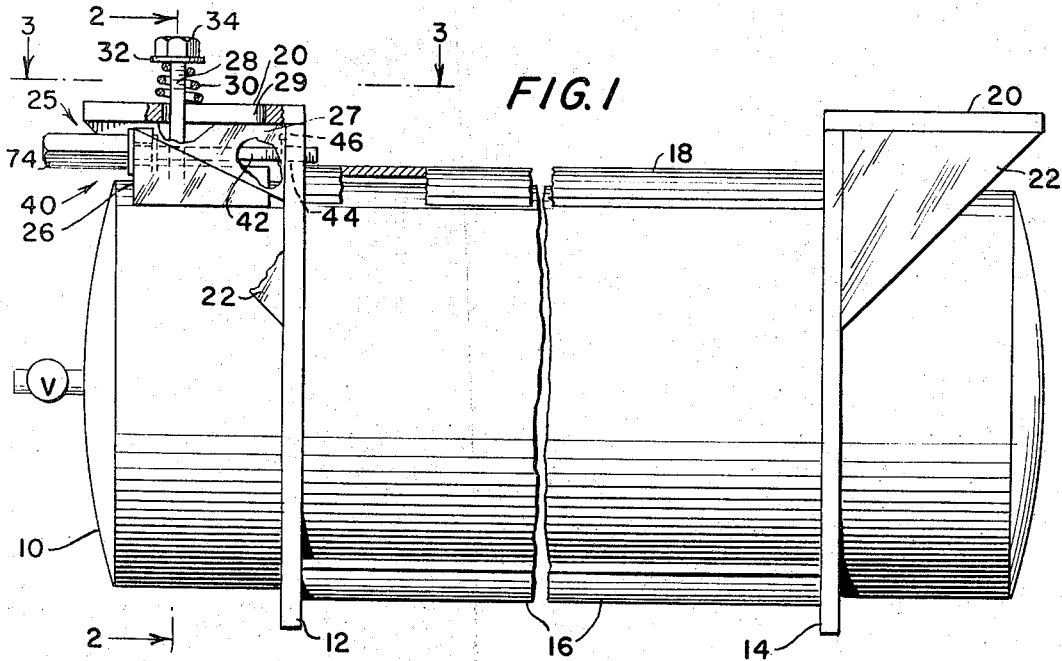
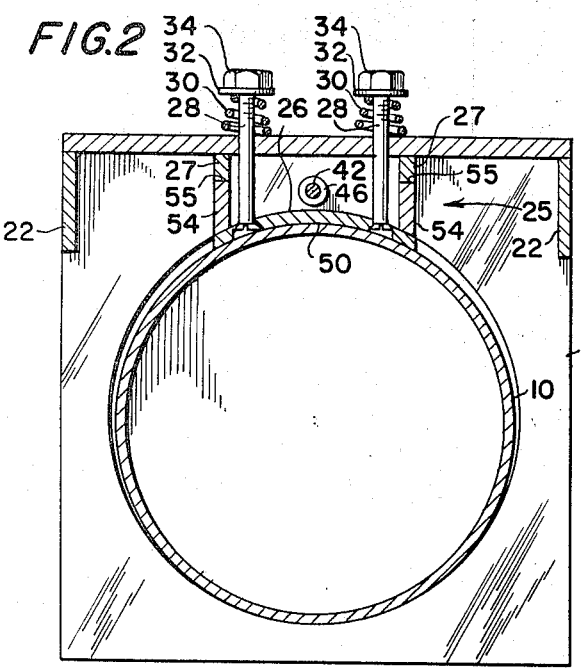
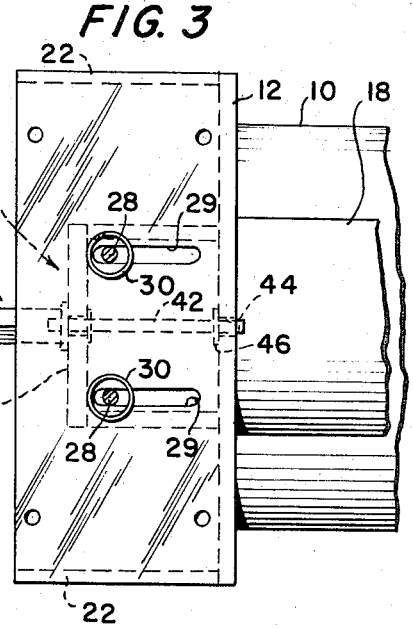
LAUREN G. KILMER
*INVENTOR.*
BY
*McLean and Boustead*
ATTORNEYS

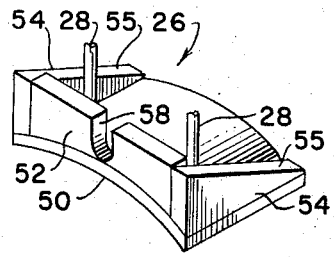
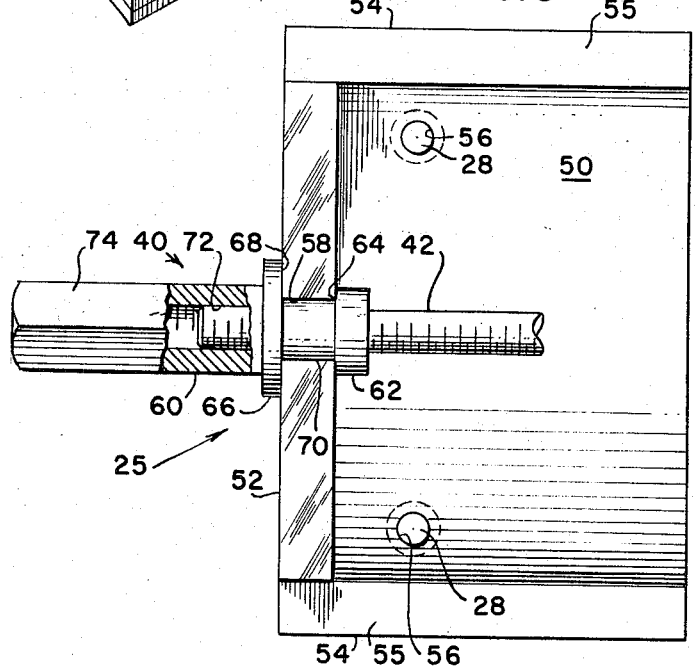
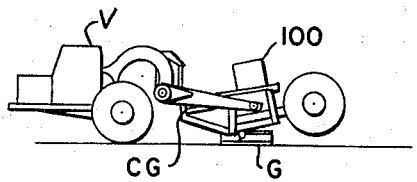

United States Patent Office 3,313,372
Patented Apr. 11, 1967

3,313,372
GAS TANK HOLDER FOR GAS EXPLODER SEISMIC GENERATORS
Lauren G. Kilmer, Tulsa, Okla., assignor to Sinclair Research, Inc., New York, N.Y., a corporation of Delaware
Filed June 30, 1964, Ser. No. 379,227
4 Claims. (Cl. 181—.5)

My invention relates to seismic prospecting and to a device for the generation of seismic waves through a pulse produced at the surface of the ground by a gas exploder-type seismic wave generator, and in particular is directed to a vehicle designed for transporting the generator from station to station during periods of use and across both rough terrain and on the highway which includes a support arrangement for gas supply cylinders used to charge the gas exploder, e.g. fuel gas, oxygen, etc., supply cylinders.

In the devices employed in seismic prospecting with which the present invention is concerned, the seismic wave is initiated by a pulse at the surface of the earth generated by a generator device resting on the ground. As described in my co-pending applications Ser. No. 187,111, filed April 12, 1962, now Patent No. 3,235,027 and Ser. No. 314,230, filed Oct. 7, 1963, a gas explosion confined in an expansible chamber acting at the earth-air interface against a large mass positioned above such gas explosion can be utilized to impart a compressive pulse to the surface of the earth beneath the gas explosion thereby initiating a seismic wave. If the explosion is confined in a device having a rigid top (carrying the weight of the large mass) and rigid bottom with vertically extensible sidewalls, the seismic wave generated is useful for seismic prospecting by refraction and reflection techniques, since the pulse imparted to the surface of the earth has a high energy content and can be made of extremely short duration.

Gas-exploder type seismic wave generators of this type can be supported on a wheeled vehicle as described in my co-pending application Ser. No. 321,743 filed Nov. 6, 1963, which has a generator support arrangement permitting engagement of the generator between forward supporting wheels and rear supporting wheels and which is capable of moving the generator approximately vertically such that the generator can be lifted clear of the ground or can be positioned down on the ground imposing the weight of the vehicle on the seismic wave generator to provide the required large mass to couple the generator with the ground. The vehicle for carrying the seismic wave generator can also carry gas supply cylinders, e.g. fuel-gas and oxygen cylinders used to charge the generator. Such gas supply cylinders can, for example, be mounted on the vehicle over the position of the generator to maximize the weight directly imposed on the generator and, at the same time, minimize the height of the vehicle.

In the past, however, difficulties have been experienced with the arrangement for supporting such gas supply cylinders due to the upward movement or bounce of the vehicle which occurs following each gas explosion. This movement tends to rotate the gas supply cylinders in their supports, e.g. racks, and to break the required gas lines, valve connections, etc. Furthermore, U.S. government regulations regarding shipping of high pressure gas cylinders are such that any visible scar on the outer surface of the cylinder renders the cylinder unsuitable for re-use.

It is an object of my invention to provide a device which can be utilized to aid in preventing rotation of the gas supply cylinders on a vehicle which is used to carry a seismic wave generator so that the vehicle can serve for transporting the gas supply cylinders from station to station during the periods when the generator is used and also across both rough terrain and on the highway from one point of use to another without damage to the cylinders. In its more specific aspects, my invention can include a horizontally and vertically movable retaining or wedging means which wedges against a stationary means secured to the cylinder support to bind the cylinder tightly in its support.

For a more complete understanding of the practical application of my invention, reference is made to the appended drawings in which:

FIGURE 1 is a side view of a cylinder support arrangement in accordance with my invention;

FIGURE 2 is a cross-section taken at line 2—2 in FIGURE 1;

FIGURE 3 is a plan section taken at line 3—3 in FIGURE 1;

FIGURE 4 is an isometric view of the movable wedge and retaining element used in the device of FIGURE 1;

FIGURE 5 is a fragmentary view of a portion of the device as seen in FIGURE 3; and FIGURE 6 is a schematic illustration of a vehicle including a generator in the position of use and upon which a device in accordance with my invention can be arranged.

Referring more particularly to FIGURES 1 through 3, reference numeral 10 designates a gas supply cylinder supported by the arrangement in accordance with my invention which basically includes two upstanding end members 12 and 14, each of which includes an opening through which the gas cylinder 10 extends, which members 12 and 14 are joined together by parti-cylindrical members 16 and 18 coaxially disposed diametrically apart from each other at the bottom and the top, respectively, of the apertures in members 12 and 14 receiving cylinder 10, and secured to such upstanding members 12 and 14 by any conventional means, e.g. welding or bolts. A plate 20, supported in part by angle plates 22, is secured to the top of each upstanding member 12 and 14.

Referring particularly to FIGURE 1, a cylinder fastening arrangement, generally designated by reference numeral 25, includes a movable wedge element, generally designated by numeral 26, and a pair of stationary wedge elements 27 secured to the plate 20 associated with member 12 by welding, for example. Movable wedge element 26 is supported from plate 20 by a pair of flat-headed bolts 28 which extend through slots 29 provided in plate 20. A compressed coil spring 30 and a washer 32 are arranged around each bolt 28 above the plate 20, and a nut 34 is secured to the top of each bolt 28 to keep the respective spring 30 in place. Coil springs 30 allow vertical movement of wedge element 26. Slots 29 are arranged so that the bolts 28 may be moved longitudinally of cylinder 10 to move wedge element 26 horizontally away from and toward the wedging elements 27. Wedge element 26 is moved horizontally by a means, generally designated by reference numeral 40, which includes a long threaded rod 42 extending through a threaded aperture 44 in upstanding plate 12 carrying a nut lock 46 securely to affix rod 42 in plate 12.

As illustrated in FIGURE 4, wedge element 26 is formed by a bottom plate 50 which is shaped to approximately the contour of the outer surface of the gas tank 10, an end plate 52 and two wedge plates 54 which are secured to bottom plate 50 one on each side of plate 52. Wedge plates 54 have sloping upper edge surfaces 55 which wedge against similar sloping under edge surfaces of wedge members 27 (see FIGURE 1) when wedge element 26 is moved inward toward the same. Countersunk holes 56 are provided in bottom plate 50 for receiving bolts 28 which support wedge member 26 from plate 20 and a U-shaped slot is provided in end plate 52 for the passage therethrough of rod 42.

The means for moving wedge element 26 on rod 42, generally designated by reference numeral 40, includes a nut handle 74 and a nut 60, more specifically illustrated in FIGURE 5, screwed onto rod 42. Nut 60 is secured to handle 74 and includes a pair of flanges 62 and 66 connected together by a short cylindrical section 70. Nut handle 74 can, for example, be welded to the nut flange 66. Nut flange 62 has a bearing surface 64 which bears against the inside surface of end plate 52 during outward movement of wedge elements 26 and nut flange 66 has a bearing surface 68 which bears against the outer surface of end plate 52 during inward movement of wedge element 26 toward wedge elements 27. Thus cylindrical section 70 is arranged in the U-shaped slot 58 in end plate 52 of wedge member 26. Nut 60 is provided with a threaded bore 72 which is drilled as deep as necessary and into which the rod 42 is threaded to permit nut 60 to move wedge 26 toward or away from plate 12.

FIGURE 6 shows a vehicle V in accordance with my co-pending application Ser. No. 321,743, filed Nov. 6, 1963, carrying a seismic wave generator G, e.g. the gas exploder of my co-pending application Ser. No. 314,230, filed Oct. 7, 1963, and a gas supply cylinder assembly 100. The assembly 100 can, for example, be comprised of a plurality of individual cylinder supports such as described above with respect to FIGURES 1–5 and typically, the assembly 100 will include six or eight individual cylinder support devices arranged side by side extending transversely on the vehicle so that a total of six or eight supply cylinder heads can be located close to one another on one side of vehicle V. Vehicle V illustrated in FIGURE 6 is in position for firing generator G to generate a seismic wave. It can be seen from the position of vehicle V, which has a center of gravity CG, that an explosion at generator G will tend to pivot the assembly 100 about an arc which movement in turn tends to rotate the individual gas supply cylinders in their support devices. The devices described above with reference to FIGURES 1–5 prevent such rotation of the gas supply cylinders on vehicle V during use of vehicle V in the following manner.

Each gas supply cylinder 10 is arranged within an individual supporting device formed by upstanding members 12 and 14 and arcuately-shaped members 16 and 18 as described above with reference to FIGURES 1–5. In practice, the outer diameter of each tank 10 is less than the diameter of the openings formed in upstanding members 12 and 14 and the instant devices prevent rotation of the gas supply cylinder 10 by a wedging action between wedge elements 27 and movable wedge element 26. To wedge each tank 10 securely in place, nut handle 74 is turned to tighten nut 60 on threaded rod 42 so that surface 68 of nut element 62 bears against the outer surface of end plate 52 and moves wedge element 26 to the right as shown in FIGURE 1. As wedge element 26 continues to move in this direction, the sloping surfaces 55 of wedge plates 54 begin to bear against the sloping surfaces of wedge elements 27 and the force vectors created at these surfaces tend to pull the movable wedge element 26 downward against the bias of springs 30 so that the shaped bottom plate 50 of the element 26 is pressed against the upper surface of cylinder 10 to tightly wedge the cylinder 10 in the opening formed in upstanding member 12 and prevent rotation thereof. During movement of element 26 in this manner, bolts 28 also slide longitudinally in slots 29 provided in plate 20. Springs 30 and slot 58 are designed to allow a sufficient downward movement of the wedge 26 for this purpose. The depth of the threaded bore 72 in nut means 60 is designed to be as deep as necessary for the nut means to be screwed onto rod 42 a sufficient distance so that wedge element 26 will be pressed downward against cylinder 10. Removal of cylinder 10 is accomplished by reversing the above procedure to release the cylinder. Nut handle 74 accordingly is turned in the opposite direction so that surface 64 of nut element 62 bears against the inner surface of end plate 52 of wedge element 26 and pull wedge element 26 to the left as illustrated in FIGURE 1. Springs 30 will raise element 26 as the element moves to the left in FIGURE 1 so that element 26 will not be in the way during removal of tank 10. It will be appreciated that while such a fastening arrangement 25 is shown only on one end of the cylinder support, i.e., on plate 12, in each case, if required, a second such fastening arrangement can be provided on plate 14 to provide a wedging pressure at the other end of cylinder 10 also.

It is claimed:

1. In a vehicle adapted to transport a gas exploder means for creating a compressive wave at the surface of the earth to cause a seismic wave to be propagated through the earth and including support means for at least one gas supply cylinder for said gas exploder means, the improvement of means for preventing rotation of said gas supply cylinder during creation of said seismic wave and movement of said vehicle including first wedge means secured to said support means, second wedge means movable with respect to said first wedge means and said support means and including means adapted to bear against the gas supply cylinder and prevent rotation of said cylinder, means for moving said second wedge means with respect to said first wedge means to cause said means adapted to bear against said cylinder to bear against said cylinder and prevent rotation thereof comprising a threaded rod secured to said support means and nut means threaded on said rod and including bearing surfaces arranged to move said second wedge means in both directions along said rod as said nut means is threaded, respectively onto and off of said rod, and means for movably supporting said second wedge means on said support means during said movement in both directions, said support means including at least one upstanding end plate having an aperture adapted to receive said cylinder and a substantially horizontal support plate above said tank, said support plate having at least one longitudinal slot therein, and said means for supporting said second wedging means on said support means including a bolt extending through said slot, a coil spring arranged above said last-mentioned substantially horizontal plate and around said bolt, and means on said bolt above said plate for retaining said coil spring around said bolt whereby said bolt is adapted to be moved horizontally in said slot and vertically against the bias of said spring.

2. The device of claim 1 wherein said second wedge means includes a bottom plate having approximately the same configuration as the outer surface of said gas tank forming said means adapted to bear against said cylinder, an end plate secured to said bottom plate adjacent one end thereof, and at least one wedge plate secured to said bottom plate and said end plate and having a sloping wedge surface adapted to bear against said first wedge means.

3. In a vehicle adapted to transport a gas exploder means for creating a compressive wave at the surface of the earth to propagate a seismic wave through the earth and including support means for at least one gas supply cylinder for said gas exploder means comprising a pair of upstanding end plates each having an aperture adapted to receive therein said cylinder, a pair of contoured, essentially horizontal members secured between and supporting said end plates and a substantially horizontal support plate secured to one of said end plates above said tank, the improvement of means for preventing rotation of said gas supply cylinder during propagation of said seismic wave and movement of said vehicle including first wedge means secured to said support plate; second wedge means movable with respect to said first wedge means and said support means and including a bottom plate having approximately the same configuration as the outer surface of said gas tank adapted to bear against the gas supply cylinder and prevent rotation of said cylinder, an end plate secured to said bottom plate adjacent one end thereof, and a pair of wedge plates secured to said bottom plate and said end plate and each having a sloping wedge surface adapted to wedge against said first wedge means; means for movably supporting said second wedge means on said support plate; and means for moving said second wedge means with respect to said first wedge means to cause said means adapted to bear against said cylinder to bear against said cylinder and prevent rotation thereof comprising a threaded rod threadedly secured to said one of said first-mentioned end plates and having a free end, and nut means threaded on the free end of said rod and including a pair of elements adapted to bear against the opposite sides of said last-mentioned end plate, said last-mentioned end plate having a U-shaped slot and a member arranged in said slot and connecting said pair of elements.

4. A device according to claim 3 wherein said support plate arranged above said tank has at least one longitudinal slot therein and said means for supporting said second wedging means from said support plate includes a bolt secured to said second wedging means and extending through a said slot, a coil spring arranged above said support plate and around said bolt and means on said bolt and above said plate for retaining said coil spring around said bolt whereby said bolt is adapted to be moved horizontally in said slot and vertically against the bias of said spring.

References Cited by the Examiner
UNITED STATES PATENTS

| | | | |
|---|---|---|---|
| 1,561,432 | 11/1925 | Hitchcock | 248—230 |
| 2,615,238 | 10/1952 | Highwood | 248—311 X |
| 2,625,354 | 1/1953 | Smith | 248—361 |
| 2,679,993 | 6/1954 | Christopherson | 248—231 X |
| 3,215,223 | 11/1965 | Kirby et al. | 181—.5 |
| 3,227,410 | 1/1966 | McCuen | 248—313 X |

BENJAMIN A. BORCHELT, *Primary Examiner.*

SAMUEL FEINBERG, *Examiner.*

G. H. GLANZMAN, *Assistant Examiner.*